US010630907B2

(12) United States Patent
Guterman et al.

(10) Patent No.: US 10,630,907 B2
(45) Date of Patent: Apr. 21, 2020

(54) METHODS OF PRODUCING VIDEO IMAGES THAT ARE INDEPENDENT OF THE BACKGROUND LIGHTING

(71) Applicant: B. G. NEGEV TECHNOLOGIES AND APPLICATIONS LTD., AT BEN-GURION UNIVERSITY, Beer Sheva (IL)

(72) Inventors: Hugo Guterman, Beer Sheva (IL); Rami Hagege, Omer (IL); Amir Kolaman, Ruhama (IL)

(73) Assignee: B.G. negev Technologies and Applications Ltd., at Ben Gurion University, Beer Sheva (IL)

( * ) Notice: Subject to any disclaimer, the term of this patent is extended or adjusted under 35 U.S.C. 154(b) by 32 days.

(21) Appl. No.: 16/080,474

(22) PCT Filed: Mar. 8, 2017

(86) PCT No.: PCT/IL2017/050287
§ 371 (c)(1),
(2) Date: Aug. 28, 2018

(87) PCT Pub. No.: WO2017/158587
PCT Pub. Date: Sep. 21, 2017

(65) Prior Publication Data
US 2019/0068862 A1      Feb. 28, 2019

Related U.S. Application Data

(60) Provisional application No. 62/307,503, filed on Mar. 13, 2016.

(51) Int. Cl.
*H04N 5/235* (2006.01)
*H04N 5/225* (2006.01)
(Continued)

(52) U.S. Cl.
CPC ........... *H04N 5/2352* (2013.01); *G03B 15/02* (2013.01); *G06T 5/50* (2013.01); *H04N 5/2256* (2013.01);
(Continued)

(58) Field of Classification Search
CPC .... H04N 5/2352; H04N 5/2356; H04N 5/332; H04N 5/23229; H04N 5/2256;
(Continued)

(56) References Cited

U.S. PATENT DOCUMENTS 5,594,344 A    1/1997  Doyle et al.
6,021,210 A *  2/2000  Camus ................ A61B 3/1216
                                                  348/370

(Continued)

FOREIGN PATENT DOCUMENTS

WO      2012/175703 A1      12/2012
WO  WO-2012175703 A1 *  12/2012  .............. G06F 3/011

OTHER PUBLICATIONS

International Search Report for PCT/IL2017/050287, dated Jun. 12, 2017; 4 pages.
(Continued)

*Primary Examiner* — Nhan T Tran
(74) *Attorney, Agent, or Firm* — Roach Brown McCarthy & Gruber, P.C.; Kevin D. McCarthy

(57) ABSTRACT

Methods of creating frames captured with a video camera that are independent of light conditions are presented. In a first method the invention attains this goal by the addition of a modulated light source, for example amplitude modulation (AM), to the background light that illuminates the scene being captured and executing an algorithm that generates processed images in which the effects of the background illumination have been eliminated. In a second aspect the invention is a method of modifying the flash no flash
(Continued)

technique by executing an algorithm that averages out the maximum and minimum intensity peaks in adjacent frames thereby allowing this technique to be employed using non-synchronous light in video.

11 Claims, 11 Drawing Sheets

(51) Int. Cl.
*G03B 15/02* (2006.01)
*H04N 5/33* (2006.01)
*G06T 5/50* (2006.01)
*H04N 5/232* (2006.01)

(52) U.S. Cl.
CPC ......... *H04N 5/2356* (2013.01); *H04N 5/2357* (2013.01); *H04N 5/23229* (2013.01); *H04N 5/332* (2013.01); *G06T 2207/20221* (2013.01)

(58) Field of Classification Search
CPC ........ H04N 5/2357; G03B 15/02; G06T 5/50; G06T 2207/20221
See application file for complete search history.

(56) References Cited

U.S. PATENT DOCUMENTS

| | | | | |
|---|---|---|---|---|
| 6,256,067 | B1* | 7/2001 | Yamada | H04N 5/2354 348/229.1 |
| 7,808,532 | B2 | 10/2010 | Sun | |
| 2002/0033989 | A1* | 3/2002 | Fisher | A61K 41/008 359/278 |
| 2004/0218830 | A1 | 11/2004 | Kang | |
| 2006/0008171 | A1 | 1/2006 | Petschnigg | |
| 2007/0268398 | A1* | 11/2007 | Raskar | G01S 17/023 348/370 |
| 2008/0203277 | A1* | 8/2008 | Warszauer | H04N 5/2256 250/208.1 |
| 2012/0038798 | A1* | 2/2012 | Woods | H04N 5/335 348/241 |
| 2013/0342694 | A1 | 12/2013 | Friedhoff | |
| 2015/0002734 | A1* | 1/2015 | Lee | H04N 5/2256 348/367 |
| 2015/0304534 | A1* | 10/2015 | Kadambi | H04N 5/2256 348/207.11 |
| 2016/0061655 | A1* | 3/2016 | Nozawa | G01S 17/10 250/578.1 |

OTHER PUBLICATIONS

Written Opinion of the International Searching Authority for PCT/IL2017/050287, dated Jun. 12, 2017; 5 pages.
O'Toole et al., Homogeneous codes for energy-efficient illumination and imaging, published in 2015, 13 pages.
Communication systems/amplitude modulation. [On¬line]. Available: http://en.wikibooks.org/wiki/-https://en.m.wikibooks.org/wiki/Communication_Systems/Amplitude_Modulation, 18 pages, printed on Aug. 28, 2018; deemed published in 2015.
Communication and Supplementary Partial European Search Report for European application No. EP 17 76 5975, datd Oct. 2, 2019; 15 pages.

* cited by examiner

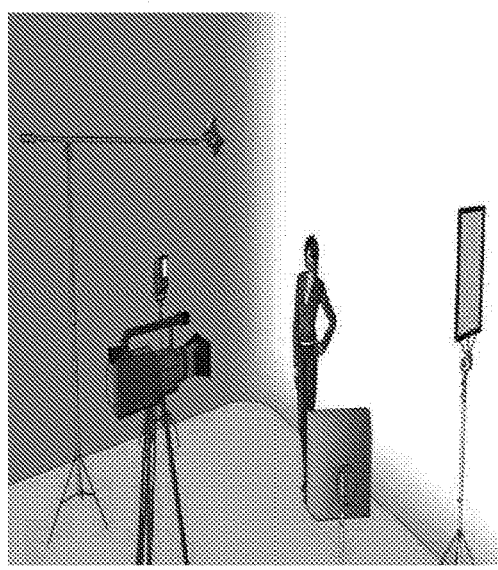
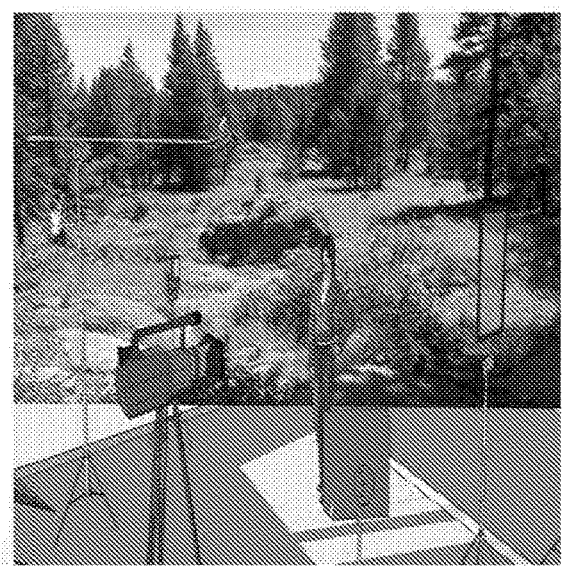
Fig. 1a    Fig. 1b
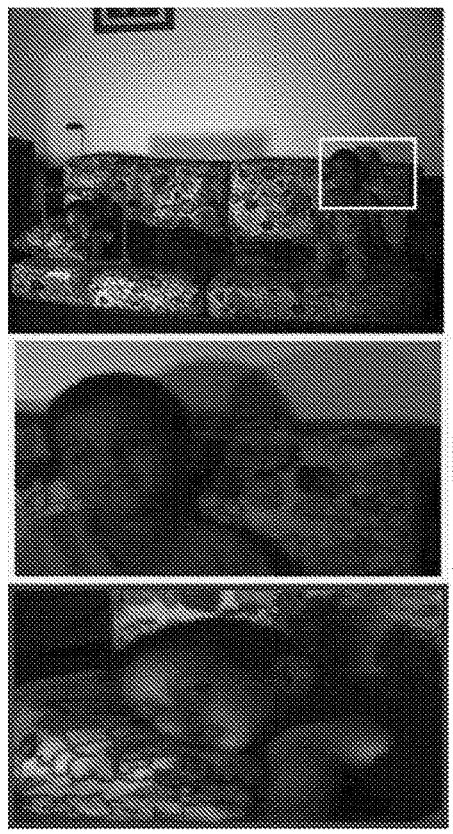
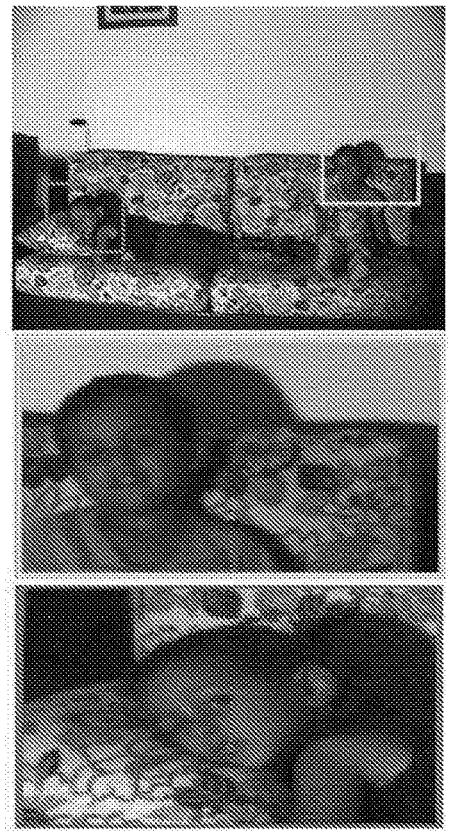
Fig. 2a    Fig. 2b

METHODS OF PRODUCING VIDEO IMAGES THAT ARE INDEPENDENT OF THE BACKGROUND LIGHTING

FIELD OF THE INVENTION

The present invention is from the field of video cameras. Specifically the invention is from the field of compensation for changing background and light conditions when recording video images.

BACKGROUND OF THE INVENTION

Publications and other reference materials referred to herein are numerically referenced in the following text and respectively grouped in the appended Bibliography which immediately precedes the claims.

Many image and video analysis algorithms demonstrate their performance in a dark room with no background lights [1] [2]. Added background lights—which vary in space, time, and spectra — create new challenges to these algorithms, by having to compensate for the presence of additional lights.

Passive solutions to these challenges compensate for the effect of the unwanted background lights by assuming a pre-known behavior of light upon objects in the scene. Spatially varying light conditions, for example, raise the challenge bar on color constancy algorithms [3] [4] [5] [6].

Active solutions use a controlled light source in order to clear the effect of the background lights in the scene. Flash no flash [7] [8] [9], for example, generates results from two captured frames: first with flash on, second with flash off, assuming a static background [10] and precise synchronization between flash and camera.

Video color correction [11] [12] and shadow removal [13] are usually treated as separate problems in the literature. Shadow removal and color correction combined could enhance the performance of many video analysis methods such as object tracking [14] and face detection [15].

It is therefore a purpose of the present invention to provide a method for creating images captured with an image sensor, such as the one used in a video camera, that are independent of light conditions.

It is another purpose of the present invention to provide a method for combining shadow correction, color correction and background removal in images captured with an image sensor in order to improve performance of smart camera systems for, inter alia, object and face recognition and detection and tele measurement of vital signs.

Further purposes and advantages of this invention will appear as the description proceeds.

SUMMARY OF THE INVENTION

In a first aspect the invention is a method of producing video images that are independent of the background lighting. The method comprises:
a) illuminating a scene, wherein the illumination is comprised of unknown background illumination and non-synchronized modulated illumination, wherein the background illumination is produced by at least one light source having spatially and temporally varying intensity;
b) capturing with a camera sensor a plurality of N consecutive frames in time containing images of the scene;
c) executing an algorithm that combines the amplitudes of the radiance of corresponding pixels in the N consecutive frames from step 'b' to form a single processed pixel, wherein the value of the amplitude of radiance of the processed pixel is that of only the modulated light;
d) repeating step 'c' for all pixels in the N consecutive frames; and
e) assembling all of the processed pixels to form a processed image that is independent of the background illumination.

In embodiments of the method of the first aspect the non-synchronized modulated illumination is at least one of;
a) amplitude modulated illumination having a single or several known constant frequencies and radiance amplitude coefficient;
b) frequency modulated illumination having a varying frequency and a constant radiance amplitude coefficient; and
c) phase modulated illumination having a varying phase with a constant frequency.

In embodiments of the method of the first aspect the non-synchronized modulated illumination source can be any light source configured such that its intensity can be turned on/off and controlled to mid ranges.

In embodiments of the method of the first aspect the non-synchronized modulated illumination source is at least one of a LED, a laser, a fluorescent light, a tungsten light, and a halogen light.

In embodiments of the method of the first aspect the non-synchronized modulated illumination source is located on the camera.

In embodiments of the method of the first aspect the non-synchronized modulated illumination source is located away from the camera.

In embodiments of the method of the first aspect the non-synchronized modulated illumination is a combination of at least two modulated illuminations simultaneously projecting light on the scene.

In embodiments of the method of the first aspect the at least two modulated illuminations can have the same type of modulation with the same or different characteristics.

In embodiments of the method of the first aspect wherein the at least two modulated illuminations have different characteristics the algorithm creates several versions of each processed pixel, wherein each version of a processed pixel has a value of the amplitude of radiance that is the same as that of those of the modulated illuminations having common characteristics.

In embodiments of the method of the first aspect the camera sensor can be one of: CMOS, CCD, light field, global shutter, rolling shutter, multispectral, hyperspectral, grey scale, and color.

In embodiments of the method of the first aspect the non-synchronized modulated illumination has one or a combination of wavelengths from one or more of the UV, IR, NIR, visible, x-ray, multispectral or hyperspectral bands.

In embodiments of the method of the first aspect the camera type can be one of: a web camera, an industrial camera, a security camera, a smart phone camera, an IP camera, a stereo camera, a structured light camera, an array of cameras, a light field camera, and a light field sensor.

In embodiments of the method of the first aspect the frequency of non-synchronized modulated illumination and the camera frame rate are independent of each other.

In a second aspect the invention is a method of producing video images that are independent of the background lighting, when background lighting between frames is constant using a non-synchronized flash no flash technique. The method comprises:

a. capturing a plurality of frames containing images of the scene using the flash no flash technique with a video camera;
b. executing an algorithm that
   i. determines the values $Fnf_k = Lmax_k - Lmin_k$, where $Lmax_k$ and $Lmin_k$ are the local intensity maxima/minima over time respectively for corresponding pixels in N successive video frames and index $1 < k < M$ spans over the number of local maxima/minima in the N video frames; and
   ii. uses the equation $$\overline{AsyncFnf} = \frac{1}{M} \sum_{1}^{M-1} Fnf_k f$$

to generate a single processed pixel having the smoothed value of intensity $\overline{AsyncFnf}$;
c. repeating step 'b' for all pixels in the N successive frames; and
d. assembling all of the processed pixels to form a single processed image in which the flickering caused by inconsistent changes of the background lighting has been smoothed over.

All the above and other characteristics and advantages of the invention will be further understood through the following illustrative and non-limitative description of embodiments thereof, with reference to the appended drawings.

BRIEF DESCRIPTION OF THE DRAWINGS

FIG. 1a and FIG. 1b schematically show the goal of the present invention;

FIG. 2a and FIG. 2b are photographs comparing the same scene shot with a conventional video camera (FIG. 2a) and a modulated video camera (FIG. 2b);

DETAILED DESCRIPTION OF EMBODIMENTS OF THE INVENTION

As said above background lights—which vary in space, time, and spectra—create challenges to prior art video analysis algorithms that have to compensate for the variations.

FIG. 1a and FIG. 1b schematically show the goal of the present invention, which is to provide methods of creating images captured with a video camera that are independent of light conditions. In the example shown in these figures, the same image of the woman is obtained under the controlled illumination conditions in the studio (FIG. 1a) and outdoors (FIG. 1b).

In a first aspect the invention attains its goal by the addition of a non-synchronized modulated light source to the background light that illuminates the scene being captured and executing an algorithm that generates processed images in which the effects of the background illumination have been eliminated. The modulated light source is independent of the camera meaning there is no synchronization between the image capturing device and the modulated illumination (hence the use of the term "non-synchronized modulated light source" herein. The modulation parameters are configured once to match the camera and capture method and from there on the modulation illumination is independent of the camera and can function separately. Herein the combination of a modulated light source and a video camera as proposed in this application is called a "modulated video camera.

In a second aspect the invention is a method of modifying the flash no flash technique by executing an algorithm that averages out the maximum and minimum intensity peaks in adjacent frames thereby allowing this technique to be employed using non-synchronous light in video.

FIG. 2a and FIG. 2b are photographs comparing the same scene shot with a conventional video camera and a modulated video camera. In these figures objects under shadows generate video frames with changing intensity and color across space and time resulting in shadows, low contrast, and color cast in the images created with a conventional camera (FIG. 2a). For the same objects imaged with a modulated video camera under the same lighting conditions, the effect of the background light is separated from the effect that the single light source has on the scene and thereby the images are clear of shadows, and exhibit the correct color and enhanced contrast (FIG. 2b).

Figure 3:
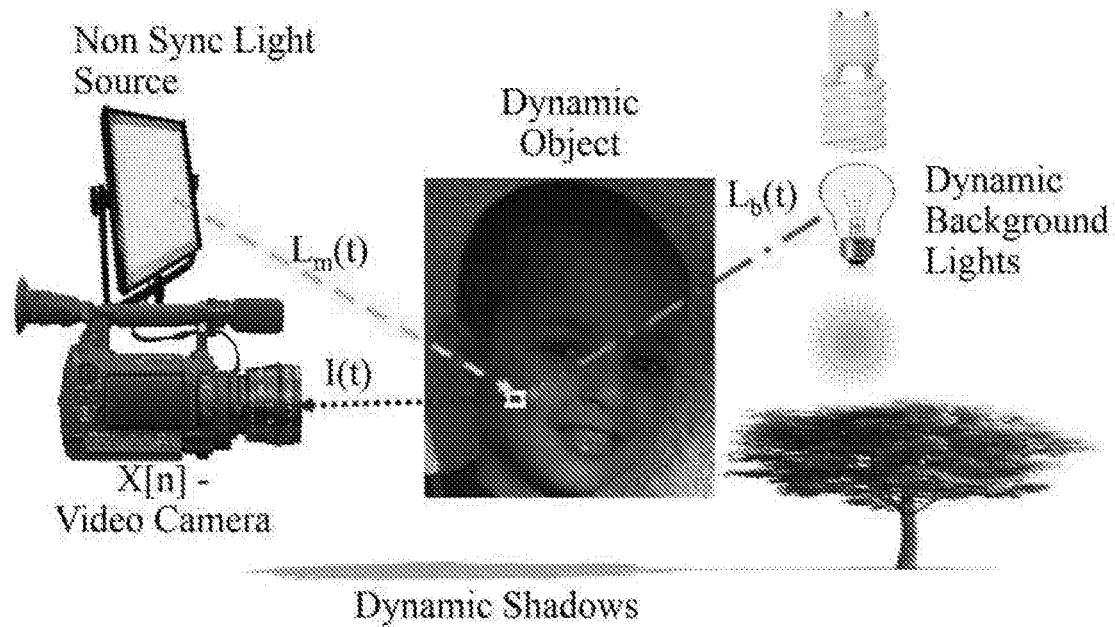
FIG. 3 shows a typical video scene with dynamic lights, shadows, and objects.

FIG. 3 shows a typical video scene with dynamic lights, shadows, and objects. The background light conditions may change unexpectedly in time and space creating non-uniform color and intensity on the moving object. Pixel measurement is a superposition of the incident light of the modulated light from the non-sync light source and the background light.

Figure 4:
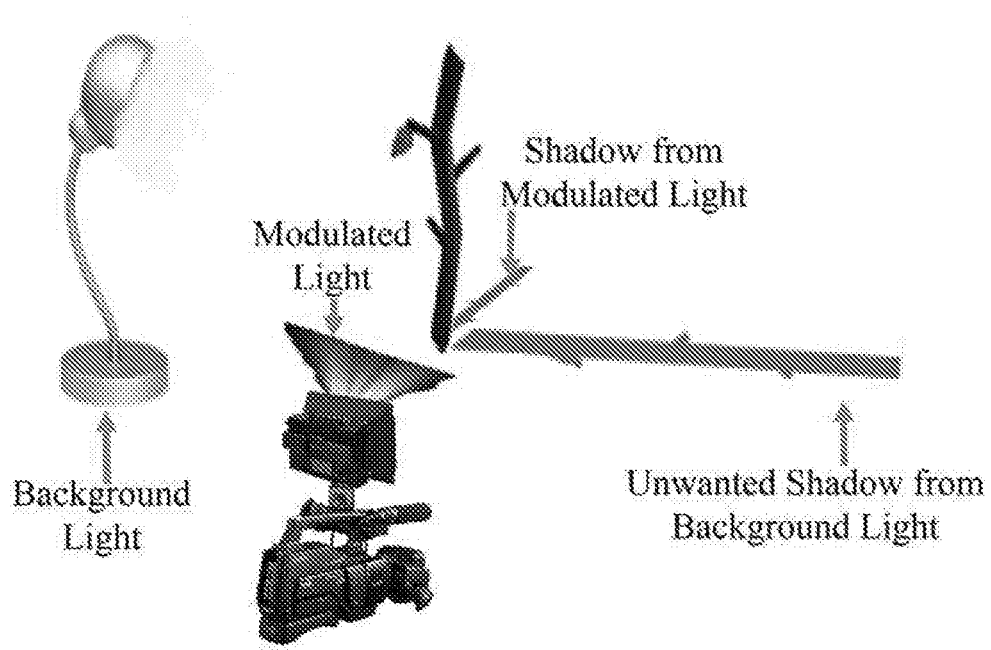
FIG. 4 illustrates how complex light conditions create multiple shadows and also illustrates the basic question behind the research that confirmed the reasoning behind the present invention.

FIG. 4 illustrates how complex light conditions create multiple shadows and also illustrates the basic question behind the research that confirmed the reasoning behind the present invention. That question is "what is the impact of a non-synchronized light situated on top of the video camera on the scene with respect to easing color correction and removing shadows created by other light sources."

The present invention is inspired by modulated communication methods such as Amplitude Modulated (AM) radio, where the voice—modulated by a radio wave—is received by the tuned radio receiver, which filters out all the other frequencies. According to the present invention in photography the scene is modulated by the light source and received by the camera. By tuning the camera to a specific frequency, it should be possible to filter out the background lights from a modulated light oscillating at that frequency. This system has similar limitations as radio communication—where every station must transmit a unique modulated signal. For example in the case of AM this means a separate frequency—the modulated light must oscillate at a unique frequency, different from the frequency of the background lights.

Although the invention herein is described in terms AM modulation a skilled person would know how to carry this in other types of modulation—for example Frequency Modulation (FM), Phase Modulation, Code Division Frequency Multiplexing (CDFM), Time Division Frequency Multiplexing (TDFM), Frequency Division Multiplexing Access (FDMA), etc.

Figure 5:
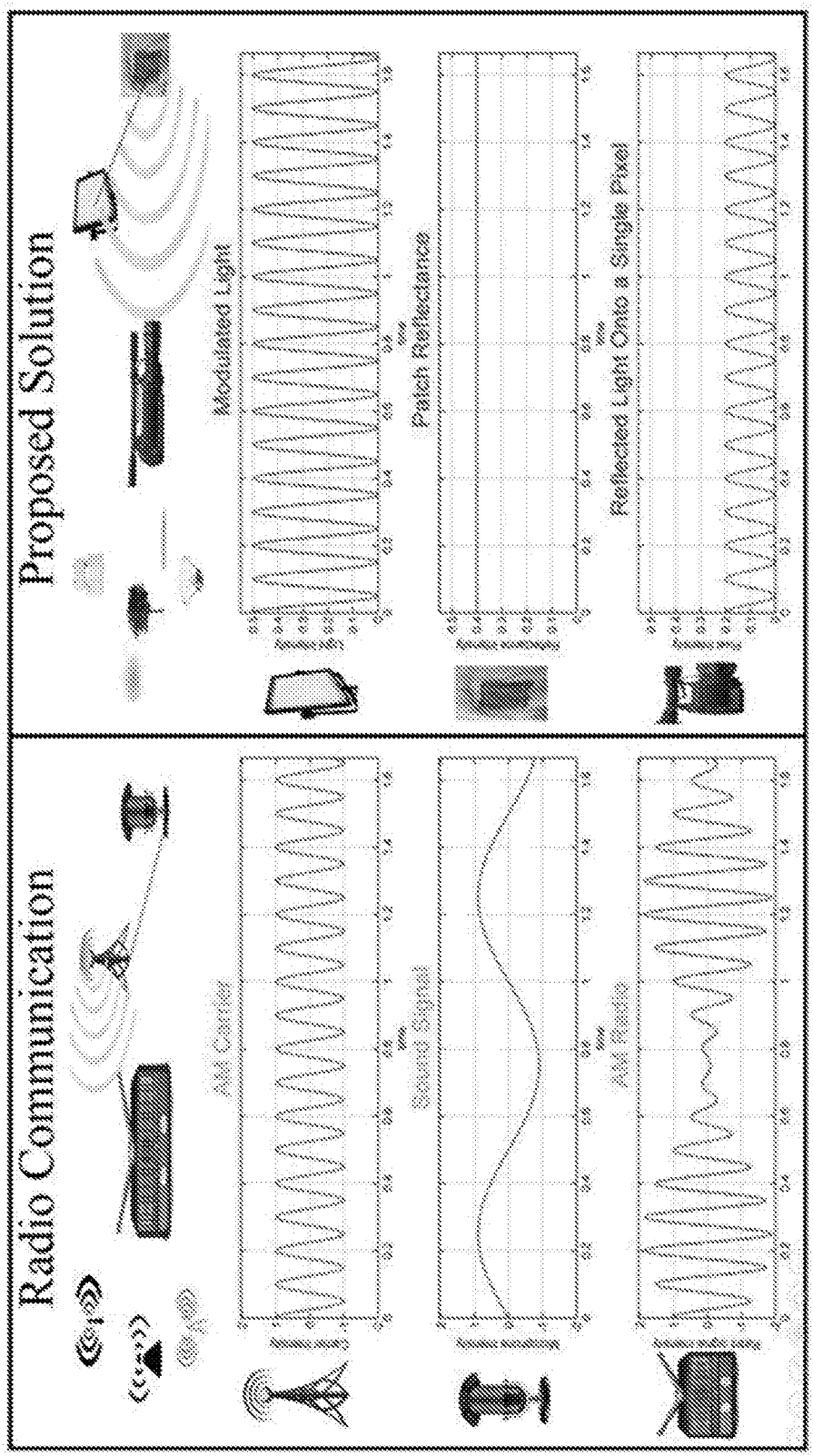
FIG. 5 shows a comparison between the use of an AM Carrier in radio communication (Left Side) and the use of modulated light in the present invention (Right Side)

FIG. 5 shows a comparison between the use of an AM Carrier to modulate the sound signal in radio communication (Left Side) and the use of modulated light in the present invention to illuminate a patch reflectance in the scene and create a reflected light into a single pixel (Right Side).

Figure 6:
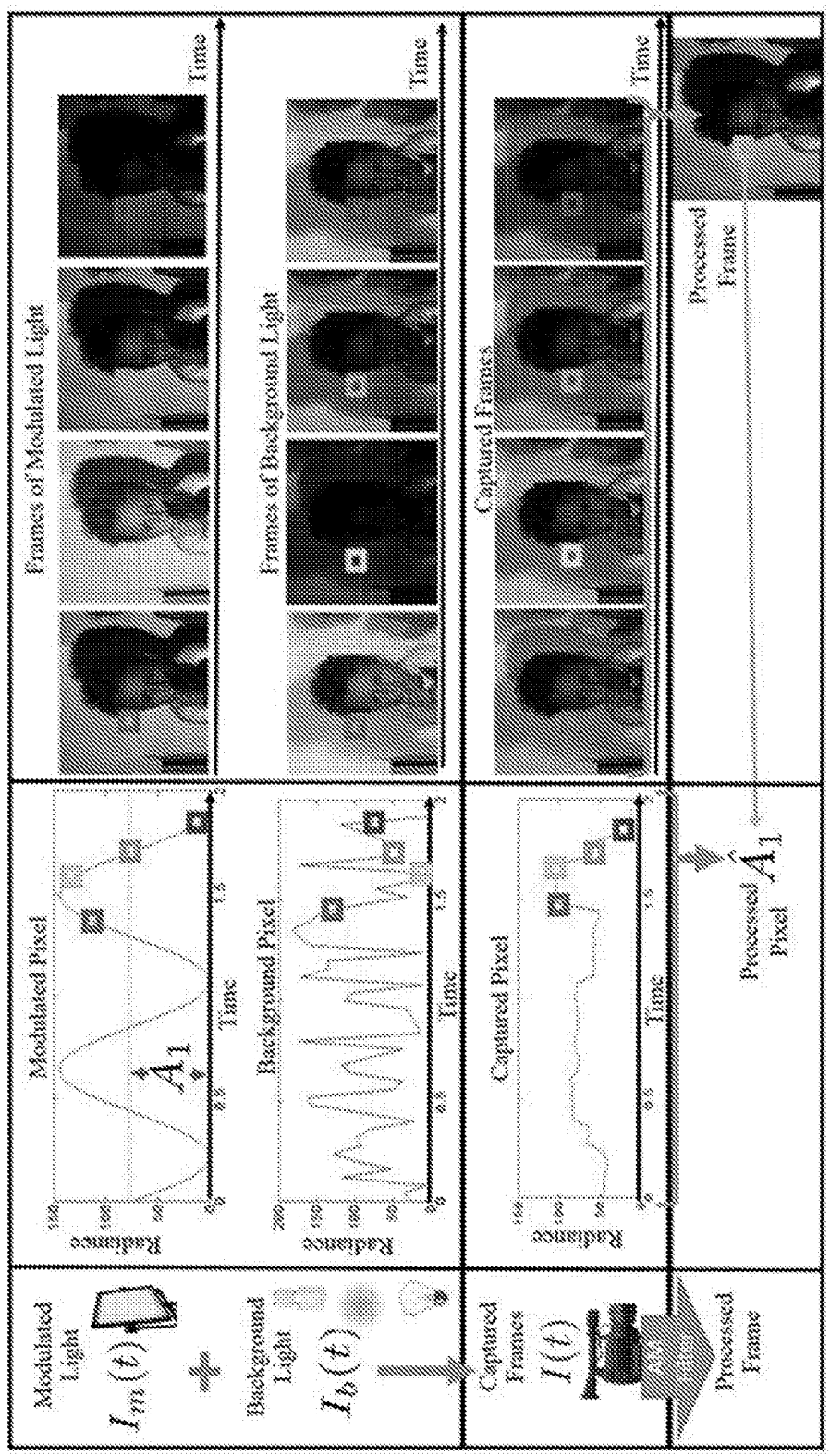
FIG. 6 illustrates the mathematical formulation of the problem addressed by the present invention and its solution.

The mathematical formulation of the problem addressed by the present invention and its solution is now discussed and is illustrated in FIG. 6. Consider the light paths shown in FIG. 3 that begins at the light sources, reflect from a patch, and are measured by a camera pixel. The light sources are divided into two groups: 1. Background sources $L_b(t)$ with an unknown behavior in time and space 2. Ideal modulated light (non-synchronized) source $L_m(f_1,t)$, which converts the objects in the scene into modulated signals in time. In case of AM for example it is modeled by the following:

$$L_m(f_1, t) = a_0 + a_1 \cos(2\pi f_1 t) \quad (1)$$

where t represents time, $a_0$ is the constant intensity over time, $a_1$ is the amplitude of the main harmonic oscillating at $$f_1 = \frac{1}{T_1}.$$

Total light in the scene, which is reflected by the object patch, generates a radiance I(t) equal to:

$$I(t) = C + A_1 \cdot \cos(2\pi f_1 t) + I_b(t) \quad (2)$$

where C depends on the patch reflectance and constant part of all the lights (modulated and background), radiance coefficient $A_1$ depends on the patch reflectance and intensity amplitude $a_1$ from eq. (1), and $I_b(t)$ are the dynamic background lights.

Amplitude modulated radiance $A_1 \cdot \cos(2\pi f_1 t)$ has two important properties: (1) The frequency $f_1$ of $\cos(2\pi f_1 t)$ is the same as the frequency of the modulated light source. (2) $A_1$ is constant in time. These properties is help to separate the influence of the modulated light ($A_1$) from the influence of the dynamic background lights ($I_b(t)$).

Radiance I(t) is sampled by a camera pixel at discrete times $n \in \{0, 1, \ldots, N-1\}$:

$$X[n] = C + I_b[nT_s] + A_1 \cdot \cos[2\pi f_1 n T_s + \varphi_1] \quad (3)$$

where C is the measured constant radiance (Note that the camera can measure radiance by normalizing its measurements with Exposure Value (EV)) of constant part (modulated and background), $I_b[nT_s]$ is the intensity of the dynamic background radiance, $$T_s = \frac{1}{f_s}$$

is the sample time of the camera (the sample frequency $f_s$ is also referred as Frames Per Second (FPS)), $A_1$ is the amplitude of the modulated radiance, $\cos[2\pi f_1 n T_s + \varphi_1]$ is a discrete sample of $\cos(2\pi f_1 t)$, and $\varphi_1$ is the unknown phase difference between modulated light and camera. Note that this sample model is ideal without noise artifacts, which will be discussed herein below.

The aim of the modulated video camera system is to reconstruct $A_1$ using pre-known information on the modulated light, such as frequency $f_1$ for example. This can be done by various communication methods [16], one of which, in case of AM, is the inner product using a Finite Impulse Response (FIR) filter:

$$\hat{A}_1 = \left| \frac{2}{N} \sum_{n=0}^{N-1} X[n] e^{-i2\pi f_1 T_s n} \right| \quad (4)$$

This filter will attenuate all the terms in Eq. (3) except for the amplitude of the oscillating part at the target frequency $f_1$ i.e. $A_1$. The purpose of the absolute value is get rid of the phase term $e^{i\varphi_1}$ which is unknown. This FIR filter works in a sliding window method at jumps between 1 and N samples between each window consisting of N frames. For example a set of 16 frames may have 4 processed images $\hat{A}_1$ from 4 windows of N=4 frames with jumps of 4 frames between each window. Another option for a set of 16 frames is to have 15 processed images $\hat{A}_1$ from 15 windows of N=4 frames with jumps of 1 frame between each window.

The pixel measurement shown in FIG. 3 and described mathematically above is shown in FIG. 6, wherein a patch/pixel affected by the modulated light $I_o(t)$ (top line) having an amplitude $A_1$, is also affected by background lights $I_b(t)$ (second line) and captured by a video camera I(t) (third line) in time. The captured values in time are processed into a single reconstructed amplitude $\hat{A}_1$ (bottom line).

In summary—The modulated video camera creates a single processed frame (bottom row of FIG. 6) using Eq. (4) from N captured frames (third row of FIG. 6), which are illuminated by both modulated light (top row of FIG. 6) and a random background light (second row of FIG. 6). The processed frame $\hat{A}_1$ (right side of the last row of FIG. 6)) is a reconstruction of the amplitude of the modulated light source $A_1$ up to a scale (second image from the left of the first row of FIG. 6)).

Although the invention herein is described in terms of video camera a skilled person would know how to carry this in other types of cameras—for example web cameras, industrial cameras, security cameras, smart phone cameras, IP cameras, stereo cameras, structured light cameras such as Apple Kinect, Intel Real-Sense or Active stereo, array of cameras, light field camera, light field sensor etc.

Performance of this reconstruction system of the invention is measured by two factors: (1). Reconstruction Error and (2) Noise levels. The real modulated light source has unwanted harmonics—which change Eq. (1) into $$L_m(f_1, t) = a_0 + a_1 \cos(2\pi f_1 t) + \sum_{k=2}^{\infty} a_k \cos(2\pi f_k t) \quad (5)$$

where $\{a_k\}_{k=2}^M$ are amplitudes of the parasitic harmonics, and $\{f_k\}_{k=2}^M$ are their frequencies.

This changes light radiance equation (2) into:

$$I(t) = C + \sum_{k=1}^{M} A_k \cos(2\pi f_k t + \varphi_k), \quad (6)$$

where the term C is a constant term of the illumination (including modulated light source and background illuminations), $\{A_k\}_{k=1}^M$ are the amplitudes of different harmonics (including modulated light source and background illuminations).

A camera captures N frames of the scene at a frame rate $f_s$. Denote by $\{t_n\}_{n=0}^{N-1}$ the acquisition time of frame number $n \in \{0,1, \ldots, N-1\}$. The time between consequent frame acquisitions is not constant due to noise, and can be described by:

$$t_n = t_{n-} + (1/f_s)(1 + q_n), \quad (7)$$

where $\{q_n\}_{n=0}^{N-1}$ is a zero mean white Gaussian noise with variance $\sigma_q^2$.

Non ideal radiance (6) change the ideal sampled signal, presented in (3), into $$X[n] = C + \sum_{k=1}^{M} A_k \cos(\omega_k T_s(n + r_n) + \varphi_k) + Z_n, \quad (8)$$

where $A_1$ is the radiance amplitude of the modulated light from Eq. (3), $\{A_k\}_{k=2}^M$ are the radiance amplitudes of background lights and parasitic harmonics of the modulated light, with their frequencies $$f_k = \frac{\omega_k}{2\pi}, \{r_n\}_{n=0}^{N-1}$$

is a Gaussian random walk process defined by $$r_n = \sum_{m=0}^{n} q_m.$$

$\{\varphi_k\}_{k=2}^M$ are the random phases of the additional harmonics distributed uniformly on the interval $[0, 2\pi]$ and independent of $\{r_n\}_{n=0}^{N-1}$ (where for each pair of phases $\varphi_j$, $\varphi_k$ the expected value $E[e^{i(\varphi_j - \varphi_k)}]$ is zero and $Z_n$ is a zero mean additive noise.

Reconstruction error is important in many applications such as spectral measurements and radiance evaluations, which gather information from a digital camera or a photometric sensor. This creates the need to evaluate the reconstruction error of the method of the invention in order to justify its use in precise measurement tools. The reconstruction error can be measured by:

$$MSE = E[|\hat{A}_1 - A_1|^2] \quad (9)$$

where MSE is the Mean Square Error between the reconstructed signal $\hat{A}_1$, and the amplitude intensity $A_1$.

Precise derivation of the MSE is difficult due to the non-linearity of the reconstruction formula (caused by the absolute value operation). A simple bound, however, on the MSE can be derived:

$$E[|\hat{A}_1 - A_1|^2] \leq MSE_C + MSE_{A_1} + MSE_{A_k} + \frac{2}{N} E[Z_n^2] \quad (10)$$

where $MSE_C$ is due to the constant term C, $MSE_{A_1}$ is due to the modulated light harmonic $\{A_1, f_1\}$, $MSE_{A_k}$ due to all the other harmonics $\{A_k, f_k\}_{k=2}^M$, and $E[Z_n^2]$ is the variance of the additive noise in (8).

$$MSE_C = C^2 \left| \frac{2}{N} \cdot \frac{\sin(\pi N f_1 / f_s)}{\sin(\pi f_1 / f_s)} \right|^2.$$

$$MSE_{A_k} = \sum_{k=2}^{M} A_k^2 (I_k^+ + I_k^-)$$

where $$I_k^{\pm} = \frac{1}{N^2} \sum_{n,m=0}^{N-1} e^{i 2\pi (n-m)(f_k \pm f_1) T_s - 2|n-m|(\sigma_q \pi f_k T_s)^2}.$$

It can be shown that $I_k^{\pm}$ decays as $O(1/N)$ if $\sigma_q > 0$. If $\sigma_q = 0$ then $I_k^{\pm}$ simplifies to:

$$I_k^{\pm} = \left| \frac{1}{N} \cdot \frac{\sin(\pi N (f_1 \pm f_k) / f_s)}{\sin(\pi (f_1 \pm f_k) / f_s)} \right|^2.$$

$$MSE_{A_1} = A_1^2 (I_1^- + I_1^+) \text{ where}$$

$$I_1 = I_1^- + 1 - \frac{2}{N} \sum_{n=0}^{N-1} e^{-2n(\pi \sigma_q f_1 T_s)^2}$$

is due to the unwanted phase noise. $I_1 \to 0$ as $(\sigma_q f_1 T_s)^2 N \to 0$ and $I_1 \to 1$ as $(\sigma_q f_1 T_s)^2 N \to \infty$.

The model can be generalized to contain additional random processes (such as white/colorful noise), not necessary periodic. If, for instance, a wide-sense stationary noise $\{b[n]\}$ with a power spectral density $S_b(\theta)$ is added to $X[n]$ then its contribution to the MSE is $$MSE_b = \frac{1}{2\pi} \int_{[-\pi, \pi]} S_b(\theta) K_N(2\pi f_1 T_s - \theta) d\theta, \quad (11)$$

-continued $$\text{where } K_N(\theta) = \left| \frac{1}{N} \cdot \frac{\sin(\theta N/2)}{\sin(\theta/2)} \right|^2.$$

If the noise {b[n]} does not contain high spectral power near the frequency $\theta=2\pi f_1 T_s$ then its contribution to the MSE will be small.

Noise Level is one of the important factors for measuring the quality of an output color image [17]. The reconstructed amplitude of the modulated intensity $A_1$ should be bigger than the camera noise levels in order to have no apparent noise artifacts [18]; meaning the radiance of the modulated light should be in the same order of magnitude as the background light. This requirement will improve performance of camera systems which separate active light from background light sources for example structured light (Apple Kinect, Intel Real Sense etc.) projected-light stereo, eye tracking (Tobii), photometric stereo.

Figure 11:
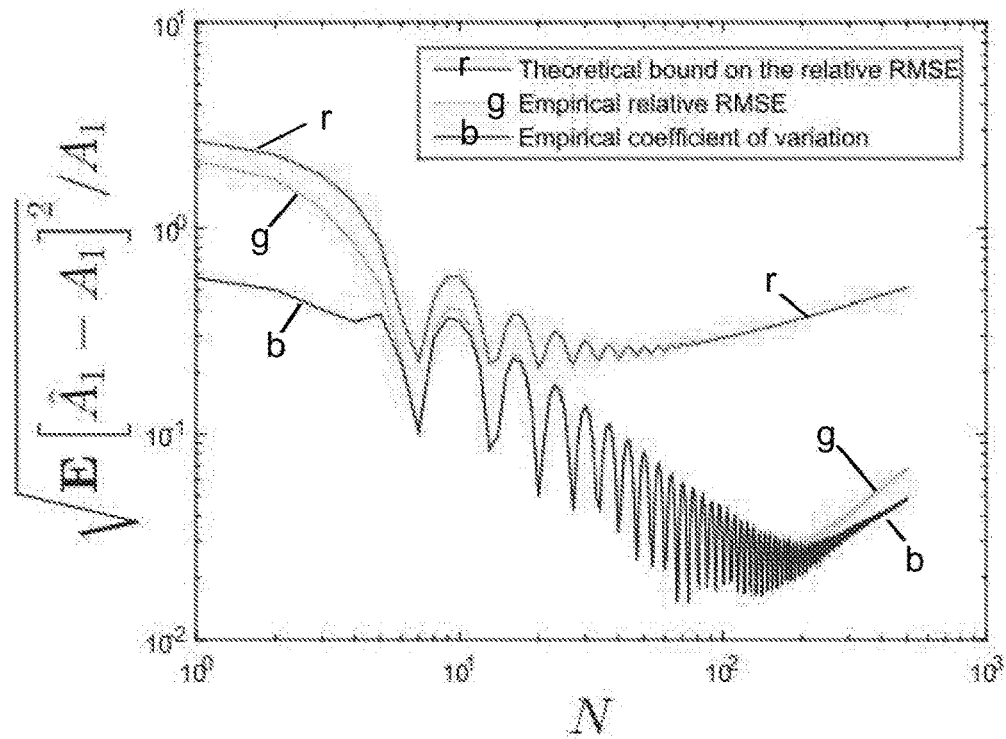
FIG. 11 shows the relative RMSE and the coefficient of variation as a function of the number of frames.

The noise level is inversely-proportional to the number of captured frames N. Apparent noise levels depend on the intensity relation between modulated light and $Z_n$, which is a zero mean additive noise. Its standard deviation (STD) depends on many factors, such as the temperature, exposure time and the average light intensity during the frame acquisition. Since only the light intensity changes from one frame to another, a function $g(\mu)$ can be defined to be the conditional STD of $Z_n$ given that X[n]−Z[n] is equal to $\mu$. Examples of the functions $g(\mu)$ for red, green and blue pixels are shown in FIG. 11, discussed herein below. The conditional mean of $Z_n$ given that (X[n]−Z[n]) is equal to $\mu$, is zero. The noise terms $\{Z_n\}_{n=0}^{N-1}$ are statistically independent of each other.

In order to experimentally show applications and analyze the output of the modulated light camera, an example system using the AM method with an online video system was built using off the shelf products. Although the invention herein is described in terms AM modulation a skilled person would know how to carry this in other types of modulation for example Frequency Modulation (FM), Phase Modulation, Code Division Frequency Multiplexing (CDFM), Time Division Frequency Multiplexing (TDFM), Frequency Division Multiple Access (FDMA) etc.

The application part of the experimental results show color correction, shadow removal, and contrast enhancement under different types of background illumination conditions and objects. Dynamic background light varied between natural (sunlight) and artificial (tungsten), while the scene type varied between static and dynamic—shadows and objects. The analysis part assessed noise and reconstruction error on the output.

Figure 7:
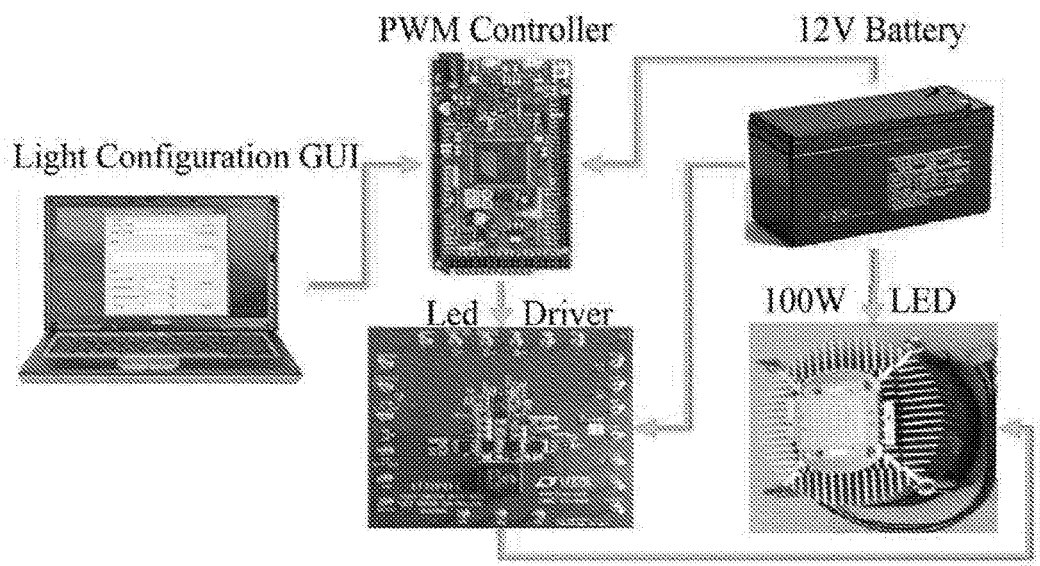
FIG. 7 symbolically shows the control system for the light source.

The example system comprises three parts: a camera sensor (such as CCD, CMOS, with global shutter or rolling shutter, a light field sensor, color sensor, black and white sensor, hyperspectral sensor, multispectral sensor, etc.); a processing unit (such as a laptop, smart phone, Image Signal Processing (ISP) unit , Application Specific Integrated Circuit (ASIC), Field Programmable Gate Array (FPGA), and a combination of the above); and a modulated light source (such as LED, tungsten, fluorescent, halogen, laser). The laptop may control the modulated light, captures the frames from the camera, and performs the post-processing. As shown symbolically in FIG. 7, the laptop sets the required modulation parameters such as frequency and amplitude of the light by configuring a PWM sine generator, which is an input to a driver board of the modulated light source. An example system may be capable of generating sine waves from 1 Hz to 600 Hz with up to 256 points per cycle and varying amplitude from 10% to 100% of a LED light source. Although the example systems described herein were carried out using a LED visible light source, a skilled person would know how to carry them out using other types of light source, e.g. IR LED, NIR laser, UV fluorescent, halogen etc. and any modulation frequency, any number of points per cycle and varying amplitude between 0% and 100%.

Two Constraints were imposed on the system. Firstly the modulated light frequency should be unique enough to make sure that the reconstructed frame contains only the modulated light source and no background lights. The required modulated light $f_1$ is set according to the available frequencies in the captured scene. The system finds the required frequency $f_1$ by capturing a set of N frames—prior to turning on the modulated light—and finding the minimal power on the FFT{X[n]}. Although the experiment herein is described in terms a single frequency $f_1$ of the modulated light a skilled person would know how to carry it out using several simultaneous frequencies or phases at the same time, e.g. using FM, CDFM, TDFM, FDMA etc.

Secondly the camera exposure was set to 1 ms in order to be able to capture up to 1000 FPS (the camera used could effectively reach 700 FPS). This fast exposure time forces the lens aperture to open at its maximum value in order to get enough light into the camera. Frames used in all of the experiments were captured by a camera with 400 frames per second and a resolution of 640x480. Although the experiment herein is described in terms of a specific exposure set, frame rate and resolution of the camera, a skilled person would know how to carry it out using different settings of exposure, frame rate and resolution, e.g. 500 ms, 25 FPS, and a resolution of 1920x1080.

It is noted that although the method described herein was used on moving objects, the processing method of the invention can produce similar results on static objects. It is also noted that although the system described herein uses a high speed camera and a custom LED in order to have a portable system capturing dynamic objects outside the lab, standard video cameras can be used to get the same reconstruction as the high speed camera for static objects. Also fluorescent/incandescent light sources oscillating at a 100 Hz or an existing flash LED light such as the flash on smart phones can be used as the oscillating light source to carry out the method of the invention. The method can be carried out using not only visible light sources but also with light sources having different wavelengths whose mid-range intensities can be controlled for example Near Infra Red (NIR) LED, IR laser, UV fluorescent, halogen etc.

Figure 16:
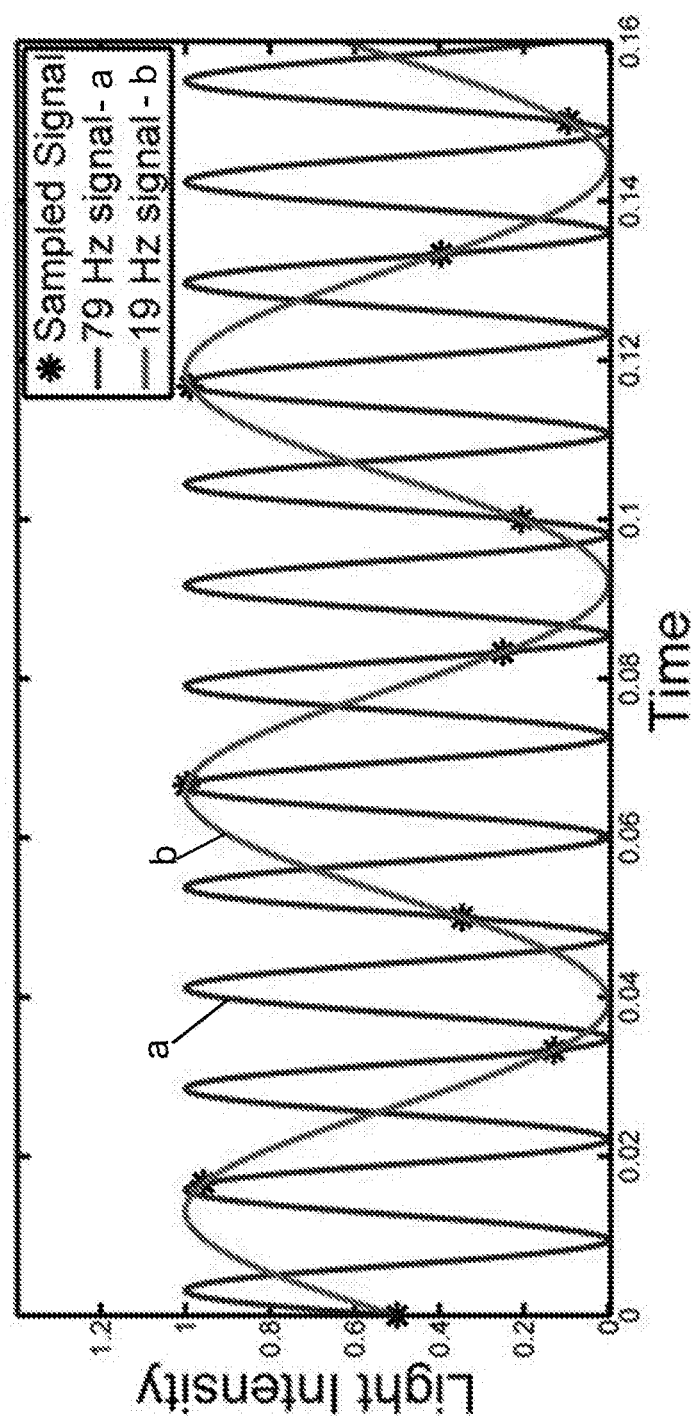
FIG. 16 shows how under-sampling can result in the same intensity values for light sources oscillating at different frequencies.

FIG. 16 shows an example of a 60 FPS camera getting the same sample values (indicated by *) for an 80 Hz (curve a) oscillating light and a 20 Hz (curve b) oscillating light creating the same amplitude.

Figure 8A:
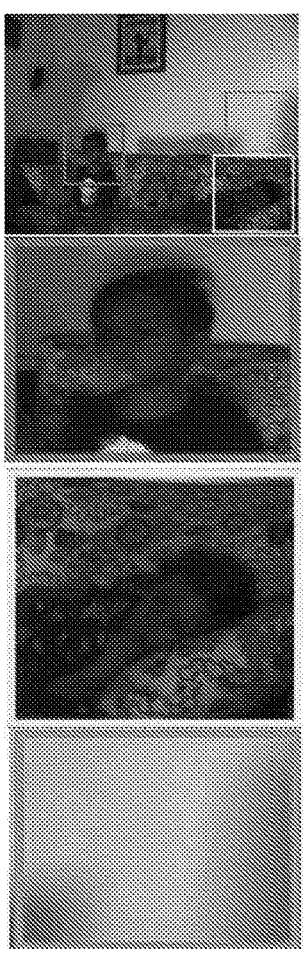
FIG. 8a and FIG. 8c show images captured by the modulated video camera.
Figure 8B:
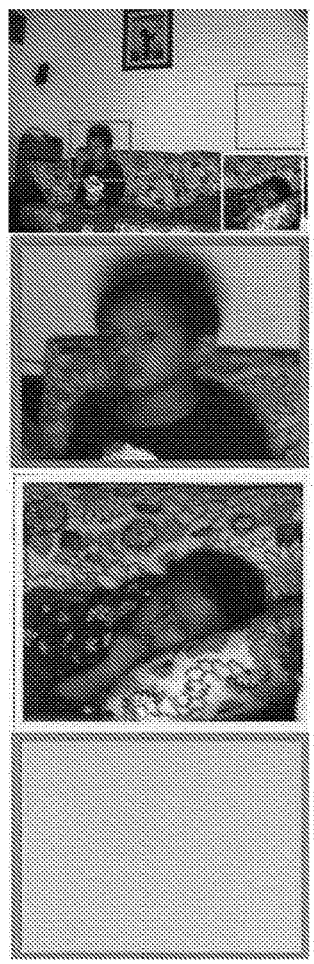
FIG. 8b and FIG. 8d show the processed frames shown in FIG. 8a and FIG. 8c respectively.
Figure 8C:
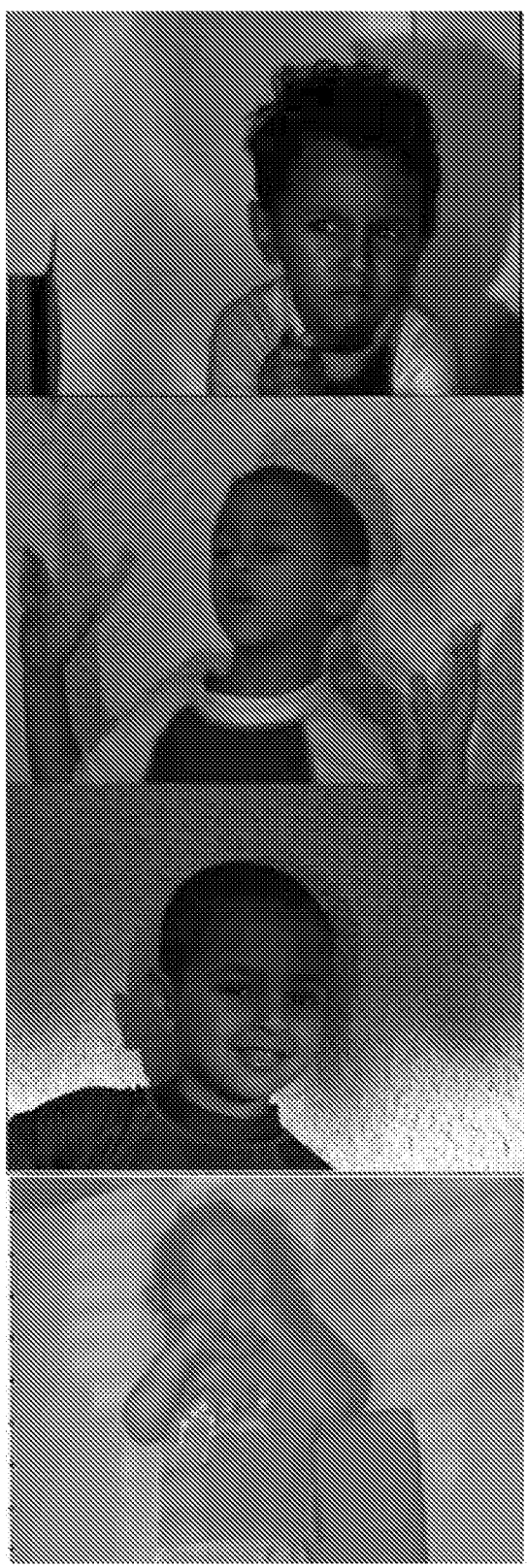
Figure 8D:
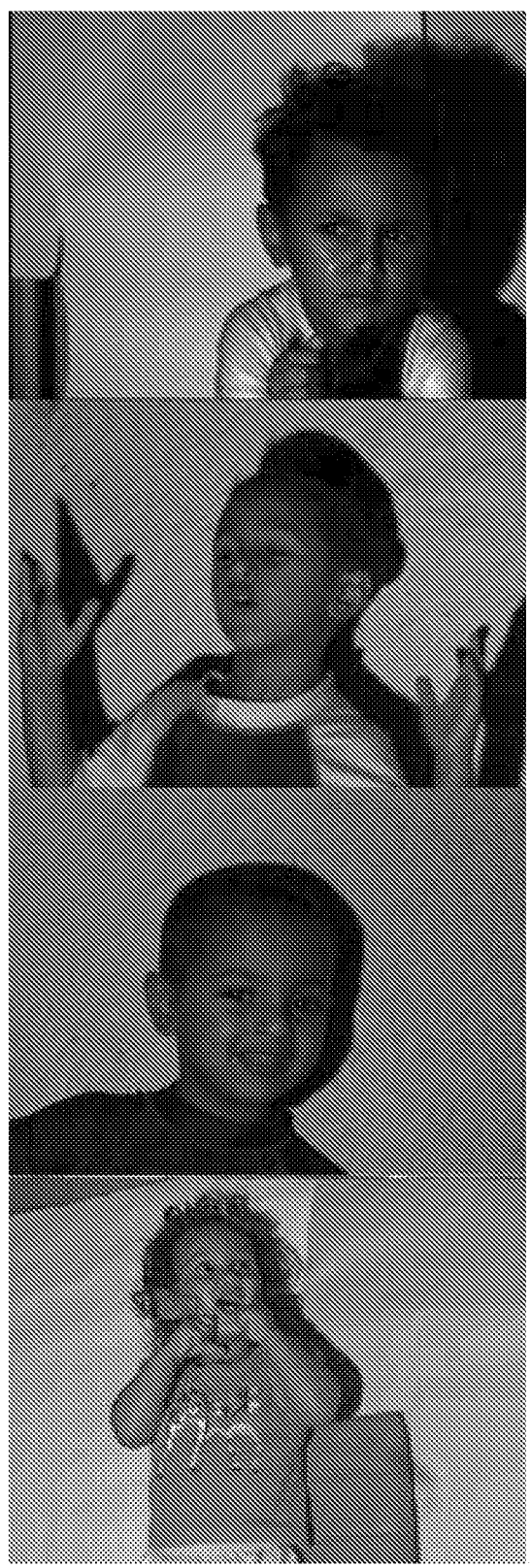

Typical results of images made using the modulated video camera are shown in FIGS. 8a to 8d, where captured frames are presented in FIG. 8a and FIG. 8c and processed frames are presented in FIG. 8b and FIG. 8d. Contrast enhancement occurs when the input image has high intensity differences between the modulated light and the background light as in the second row of FIG. 8a and the fourth and third rows of FIG. 8c. Color correction occurs when the background light and the modulated light have large color differences, as in the last row of FIG. 8a and first and second row of FIG. 8c.

Background lights generate shadows, which are captured by the camera. A light source situated on-top of the camera creates shadows that do not appear in the frame because this light path is almost aligned with the optical axis of the camera (FIG. 4). Thus the modulated video camera removes shadows caused by the background lights by generating an image influenced only by the modulated light (middle images of FIGS. 8b and 8d). In embodiments of the method the modulated light can be located away from the camera in which case shadows will appear in the scene. For example the modulated light source may be embodied as light bulbs or tubes in light fixtures, as car lights, as an array of flash lights situated on the camera, or as street lights. The location of the modulated light source may be a combination of lights on the camera and off the camera.

Although the method is described herein in terms of a single modulated light source, a skilled person would know how to carry the method out using several modulated light sources acting in parallel, which can have same or different modulation characteristics. In the case in which the light sources have the same characteristics the result would be a single image, which would appear as having only these light sources and show the shadows created by each of them. In case the light sources have different characteristics the result would be several images, each of which would appear as having only one light source and show the shadow created by it.

Most color correction techniques assume that there is a single light source in the scene [6]. It is safe to state that the resulting frames of modulated video camera have a single pre-known light source. Illumination certainty of the modulated video camera frames causes color constancy algorithms to perform better than with the standard camera—as seen in the top two images in FIG. 8d and bottom image at FIG. 8d.

Uneven light across the scene may generate low contrast at some parts of the image even though the entire dynamic range of the camera is used (two bottom images of FIG. 8c). Uniform light conditions, generated by removing the background lights and shadows, improves local image contrast (two bottom images of FIG. 8c).

In order to compare noise and reconstruction error of the modulated video camera with the standard camera a static scene was captured at a frame rate of $f_s$=704 Hz with different constant light illuminations and modulated light with a frequency of $f_1$=105 Hz.

Figure 9:
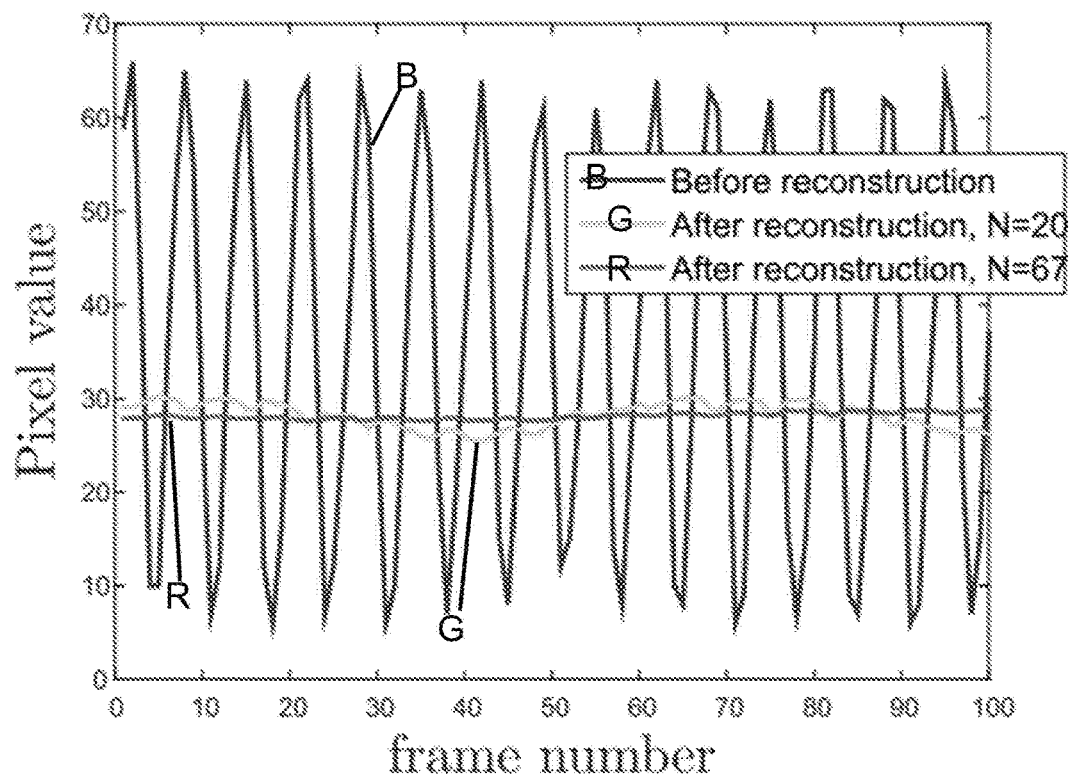
FIG. 9 presents the values of a single pixel as a function of time before and after reconstruction.

FIG. 9 presents the values of a single pixel as a function of time before and after reconstruction. FIG. 9 demonstrates how the pixel values are only due to the modulated illumination. The curve labelled b shows the pixel value captured by the camera when no background lights are present. The curves labelled g and r show the processed pixel's values. $\hat{A}_1$ and N=20 frames were used to calculate the g curve. $\hat{A}_1$, and N=67 frames were used to calculate the r curve. For these values of N the value of $Nf_1/f_s$ is close to an integer and the value of $MSEC_C$ in (10) is very small. Note N=67 and N=20 were chosen according to the local minima of the relative root mean squared error (RRMSE) defined by $$\frac{\sqrt{E[\hat{A}_1 - A_1]^2}}{A_1}$$

(FIG. 10).

Figure 10:
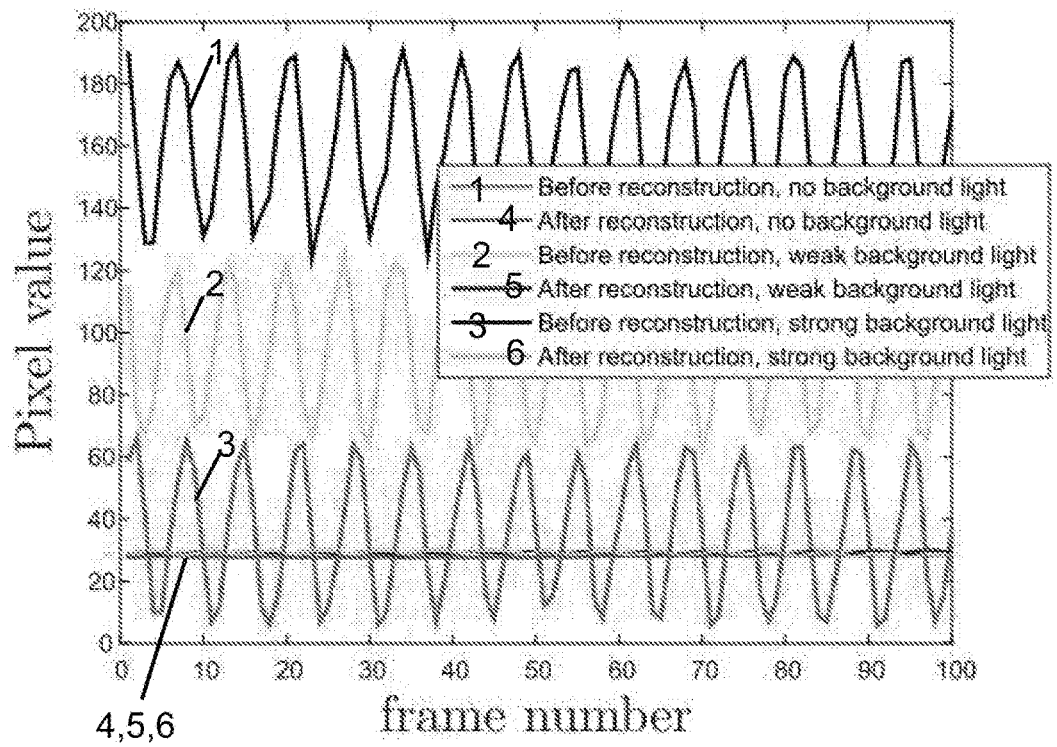
FIG. 10 shows the values of the pixel measured in FIG. 9 before and after reconstruction as a function of time for different background illuminations.

FIG. 10 shows the values of the pixel measured in FIG. 9 before and after reconstruction as a function of time for different background illuminations. Curve 1 shows the pixel values captured by the camera without background lights. The curves 2 and 3 show the pixel values captured by the camera when weak and strong background illumination is present, respectively. curves 4, 5, and 6 show the processed pixel's values $\hat{A}_1$ from curves 1, 2, and 3 respectively. N=67 was used for the calculation of $\hat{A}_1$. Background illumination has a negligible influence on the reconstructed pixel values, as can be seen from FIG. 10.

Performance of the reconstruction system was evaluated by the following features:

Standard deviation of a reconstructed pixel $\hat{A}_1$ when the scene is static.

Coefficient of variation defined by $$\frac{STD(\hat{A}_1)}{\mu_{\hat{A}_1}},$$

where $\mu_{\hat{A}_1}$ is the expected value of $\hat{A}_1$.

RRMSE

FIG. 11 shows the RRMSE as a function of N (number of frames for calculation of $\hat{A}_1$). Curve g represents the empirical RRMSE, Curve r represents a theoretical upper bound—based on (10)—and curve b represents the empirical coefficient of variation. To calculate the theoretical upper bound for the RRMSE the following parameters were estimated from the curve b in FIG. 9:

$$\frac{C}{A_1} = 1.23, \frac{A_2}{A_1} = 0.13, \frac{A_3}{A_2} = 0.03,$$

where $A_2$, $A_3$ are the amplitudes of additional harmonics of our modulated illumination. The frequencies of these harmonics are $f_k = k \cdot f_1$, for k=2,3. The value of $(\sigma_q f_1 T_s)^2$ is taken to be $1.6 \cdot 10^{-3}$. The function $g(\mu)$ used to estimate the last term of equation (10) is the $g(\mu)$ for blue pixels shown in FIG. 12.

Reconstruction error (equation (10)) explains several visible phenomenon of the graph (FIG. 11): Firstly, local minimums are generated by the variance of $MSE_c \rightarrow 0$ when $N \cdot f_1/f_s \in N$ and $f_1/f_s$ is far from an integer. Secondly, MSE diminishes as N gets larger up to a limit.

Since $\sigma_q$ is not zero, $\hat{A}_1$ tends to zero and the RRMSE tends to 1 as N tends to infinity. The reason is because in the inner product $$\sum_{n=0}^{N-1} X[n] e^{-i 2\pi f_1 T_s n}$$

the component of X[n] that should be proportional to $e^{i 2\pi f_1 T_s n}$ contains a phase noise. That noise makes this component to be in the same phase as $e^{i 2\pi f_1 T_s n}$ for some times and in the opposite phase for other times. The sum of these terms would cancel, leading the whole sum to grow slower then N. The multiplication of the whole sum by 2/N makes it tend to zero as N tends to infinity. If, on the other hand, $\sigma_q=0$ then $\hat{A}_1$ would tend to $A_1$ and the RRMSE would tend to zero, since the upper bound in (10) would tend to zero.

Figure 12:
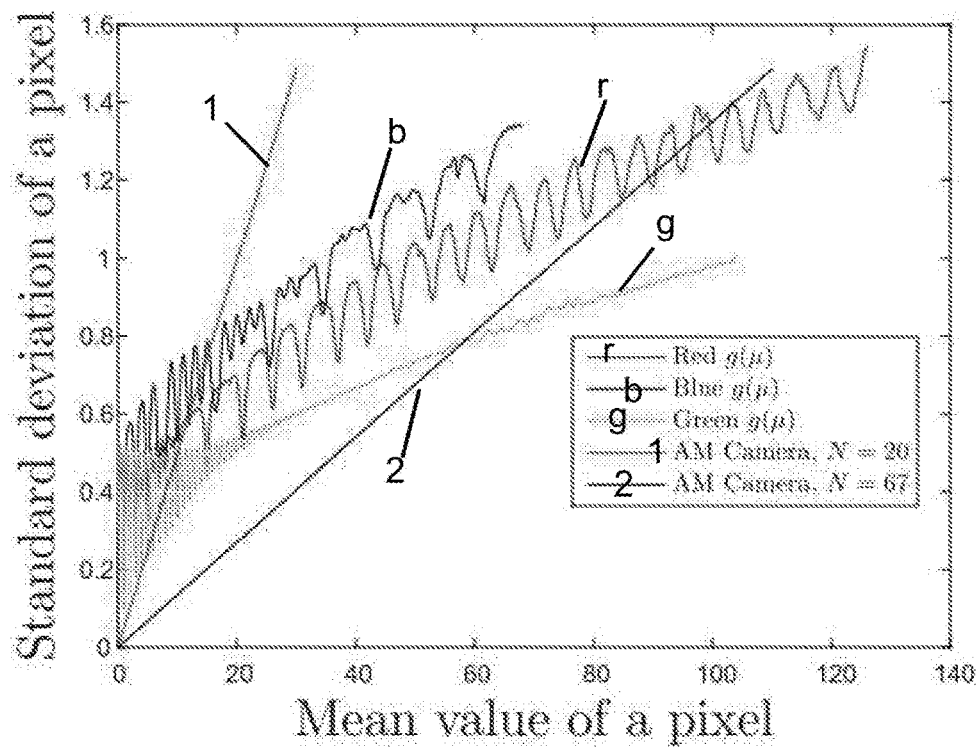
FIG. 12 shows the STD of the pixels as a function of their mean value for the standard and the modulated video camera.

FIG. 12 shows the STD of the pixels as a function of their mean value for the standard and the modulated video camera. Curves r, g, and b represent the function $g(\mu)$ (for red, green and blue pixels respectively), which is the STD of a pixel in a standard camera given that its mean value is $\mu$. The STD of $\hat{A}_1$ are shown in curve 1 (for N=20) and the curve 2 (for N=67) for the scenario when there is no background illumination. These graphs are the same for the red, green and blue colors, and grow linearly as a function of μ. This can be explained by equation 10, since all terms in that bound, except for the last term that is much smaller than the others, are proportional to $A_1^2$.

The modulated video camera system of the present invention demonstrates a low complexity and effective system for performing shadow removal, color correction, contrast enhancement and background removal on real time video frames (FIG. 8). Performance analysis demonstrated how precision of the modulated video camera grows as number of sampled frames N increases up to a limit—which was proven analytically and experimentally (FIG. 11). The modulated video camera is unaffected by the intensity of the background assuming the modulated amplitude $A_1$ is larger than the camera noise values. In practice, modulated light intensities surpassing 20 percent of background light level gave appreciable results. For cases of very high intensities of background light the system of the invention could work in sunlight using method such as [19] with some minor adjustments to work with a rolling shutter camera.

Reconstruction analysis proved that there is an analytical and experimental upper bound to the MSE (FIG. 11). Noise levels of the modulated video camera resemble the noise level of the standard camera (FIG. 12) and get closer to its performance as N grows.

The present invention is closely related to [20], but in this invention non-synchronized light is used without any spatial patterns. It is also related to [21], who suggested a similar method but used HDR and precise synchronization with the modulated light. It is different from inventions such as [22], which use a synchronized light with a still camera. The present invention uses a non-synchronized light with video. The present invention is able to get the same background removal effect as in [23] but in video instead of still imaging. It differs from [24], which uses flickering non-synchronized light from a TV set on a web camera. The present invention uses different modulation methods on the light, a different method of processing, and differs in its robustness to other flickering lights in a room, or in other locations.

The present invention is similar to [25] but differs in that [25] enhances frames from a camera using software only while the present invention uses a combination of software and illumination hardware. The present invention assumes that the camera is able to sense the illumination added to the scene, while [25] assume the presence of pre-known recognizable objects in the scene.

The result of applying the system and method may be used to create a video with constant color (fixed white balance), enhanced contrast, without shadows and foreground background removal. This helps to improve facial recognition, object recognition and detection. This improvement can be used in vehicles, agricultural robots, security cameras and any type of smart system that uses a camera input. It helps improve the accuracy and range of active 3d cameras such as active stereo, 3d projection (Kinect etc), photometric stereo and others. It also helps to improve eye tracking accuracy. It help to gain better medical examination via a camera, e.g. pulse measurement, oxygen measurement etc. It may also be used in video photography to get a better video by blending/removing or separating background light and modulated illumination. It can also be used as a color/hyperspectral camera from a greyscale sensor. It can also be used to improve color of underwater video.

In summary, the highlights of the present disclosure are:
A prototype system comprising a modulated video camera has been built and tested extensively under different light conditions showing real time video color correction, shadow removal, contrast enhancement and background removal.

The method uses the principle of signal modulation/demodulation from the communication field applied to computational photography. A demodulation filter reconstructs the scene illuminated only by the modulated light source, and separates it from signal modulation/de-modulation of all the other background lights.

Light source separation may be used as an application of the method for shadow removal, color correction, contrast enhancement and background removal. The shadows in the reconstructed image are minimized by placing the modulated light source near the camera. Color correction is easier to perform because the reconstructed modulated frame contains a single light source. Contrast is enhanced due to uniform light conditions in the modulated frame.

A highly parallelizable algorithm, which has good potential to work on devices with low processing powers such as currently available smart phones, was developed and presented herein. The algorithm works separately on each pixel and its results are independent of neighboring pixels.

The method requires no synchronization between light and video camera, thus needing less hardware, and is simpler to implement.

The method can be implemented directly on available hardware using software alone.

Another possible method for background removal is the flash no flash technique in video. However, this technique requires precise synchronization between video frames and light [8],[9]. To the best of the inventors' knowledge there has not previously been proposed a flash no flash technique using a non-synchronous light in video.

Flash no flash is used extensively in still images as in [10], which is the basis of the Nokia Lumia 'Dynamic Flash' function of Microsoft. However a similar commercial solution for video does not exist in the market.

Figure 13:
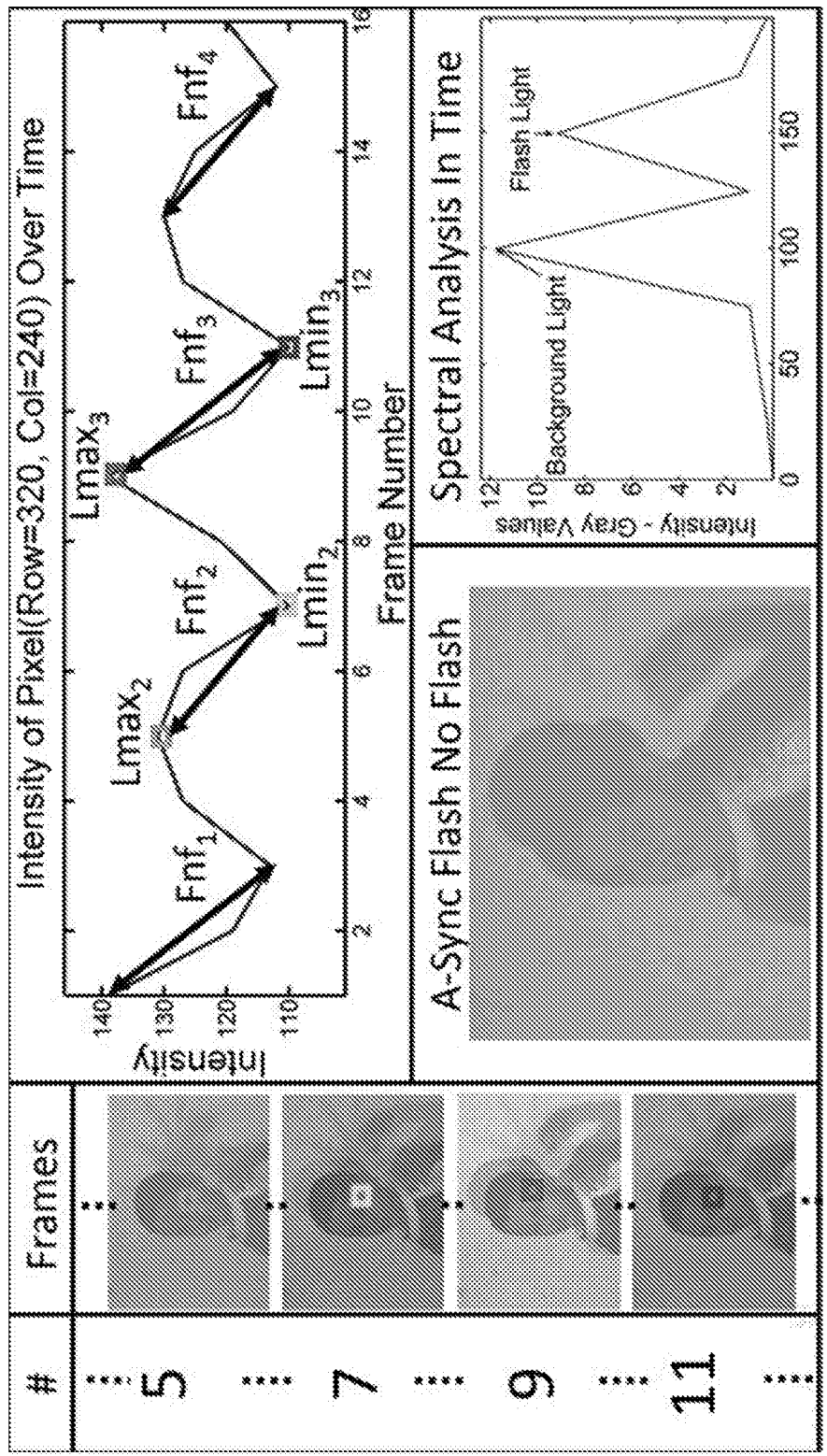
FIG. 13 shows the problem of using the flash no flash technique with a standard video camera.

Flash no flash assumes constant illumination and constant background between two subsequent frames. A time varying background light source breaks down the assumption of a static background and introduces noticeable artifacts. Oscillating background light, such as fluorescent light [22], may degrade the result of a-sync flash no flash as seen in FIG. 13 and generate the need for a better solution. When flash no flash techniques are applied to indoor video with changing background lights, such as incandescent/fluorescent light, they may produce a video sequence with (a) Low contrast output (middle bottom part of FIG. 13)—due to negative change in the background lights between two subsequent frames.

(b) Inconsistent flickering video (FIG. 14 lower series of images)—due to inconsistent changes in the background lights between two subsequent frames.

FIG. 13 shows the problem of using the flash no flash technique with a standard video camera. FIG. 13 shows an example of a sampled movie of a dynamic scene with flash no flash, oscillating at 150 Hz, and background light, oscillating at 100 Hz, reconstructed by a-sync flash no flash. Using the flash no flash method a sampled pixel in time shows flash points $L_{max}$ and no-flash points $L_{min}$ (top right part) creating an image with low contrast Fnf (middle bottom part). A spectral analysis of the sampled pixel is shown at the bottom right part.

The modulated video camera technique of the present invention described herein above actively eliminates the influence of illumination changes. Therefore the video produced by the modulated video camera is much more consistent than the one produced by flash no flash techniques.

Figure 14:
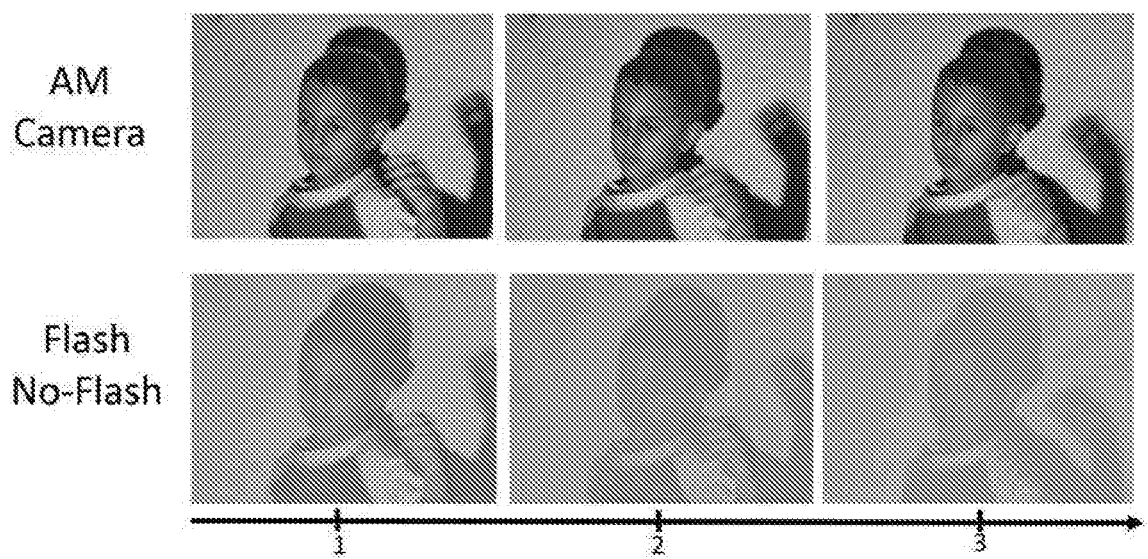
FIG. 14 shows the inconsistency of the flash no flash method when the background light changes compared with the modulated method of the present invention.

FIG. 14 shows the inconsistency of the flash no flash method (bottom row of images) when the background light changes compared with the modulation method of the present invention (top row of images).

A way of dealing with the problem of non-stable video output obtained using the flash no flash method under conditions of changing background light is to treat the local maxima/minima over time (Upper graph in FIG. 13) as the flash/no-flash frames:

$$Fnf_k = Lmax_k - Lmin_k \qquad (12)$$

where $Lmax_k$ and $Lmin_k$ are the local maxima/minima over time, respectively, and index $1 < k < M$ spans over the number of local maxima/minima in the N video frames.

Figure 15:
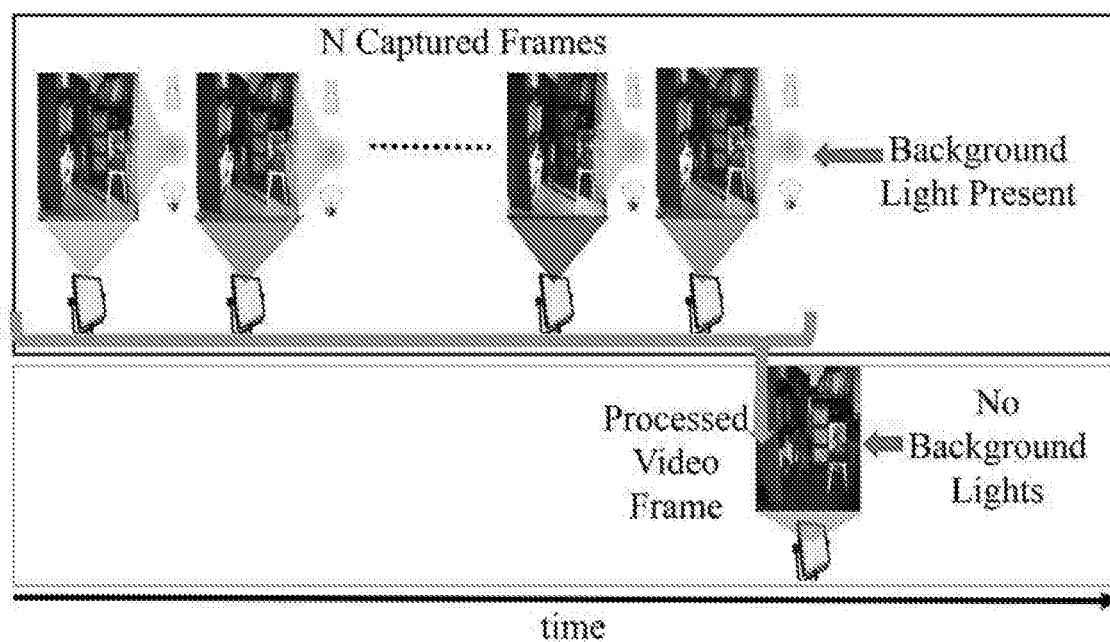
FIG. 15 schematically shows the capturing and processing stages in time wherein a single processed frame is generated from N captured video frames.

FIG. 15 schematically shows the capturing and processing stages in time wherein a single processed frame is generated from N captured video frames. In FIG. 13, for example, N=16, M=4. Smoothing in time in this manner lowers noise by:

$$\overline{AsyncFnf} = \frac{1}{M} \sum_{1}^{M-1} Fnf_k \qquad (13)$$

where $Fnf_k$ is defined in Eq. (12) and M flash no flash frames are used for smoothing over time.

Although embodiments of the invention have been described by way of illustration, it will be understood that the invention may be carried out with many variations, modifications, and adaptations, without exceeding the scope of the claims.

BIBLIOGRAPHY

[1] M. 0. et. al. (2015) Homogeneous codes for energy-efficient illumination and imaging. [Online]. Available: http://www.dgp.toronto.edu/~motoole/energyefficientimaging.html
[2] C. Tsiotsios, M. E. Angelopoulou, T.-K. Kim, and A. J. Davison, "Backscatter compensated photometric stereo with 3 sources," in *Computer Vision and Pattern Recognition (CVPR), 2014 IEEE Conference on.* IEEE, 2014, pp. 2259-2266.
[3] H. R. V. Joze and M. S. Drew, "Exemplar-based color constancy and multiple illumination," *Pattern Analysis and Machine Intelligence, IEEE Transactions on,* vol. 36, no. 5, pp. 860-873, 2014.
[4] E. Hsu, T. Mertens, S. Paris, S. Avidan, and F. Durand, "Light mixture estimation for spatially varying white balance," in *ACM Transactions on Graphics (TOG),* vol. 27, no. 3. ACM, 2008, p. 70.
[5] B. Li, W. Xiong, W. Hu, and B. Funt, "Evaluating combinational illumination estimation methods on real-world images," *Image Processing, IEEE Transactions on,* vol. 23, no. 3, pp. 1194-1209, 2014.
[6] A. Gijsenij, T. Gevers, and J. Van De Weijer, "Computational color constancy: Survey and experiments," *Image Processing, IEEE Transactions on,* vol. 20, no. 9, pp. 2475-2489, 2011.
[7] S. He and R. W. Lau, "Saliency detection with flash and no-flash image pairs," in *Computer Vision-ECCV* 2014. Springer, 2014, pp. 110-124.
[8] O. Suominen and A. Gotchev, "Preserving natural scene lighting by strobe-lit video," in *IS&T/SPIE Electronic Imaging.* International Society for Optics and Photonics, 2015, pp. 919-939.
[9] C. Wu, R. Samadani, and P. Gunawardane, "Same frame rate it to enhance visible video conference lighting," in *Image Processing (ICIP), 2011 18th IEEE International Conference on.* IEEE, 2011, pp. 1521-1524.
[10] J. Sun, J. Sun, S. B. Kang, Z.-B. Xu, X. Tang, and H.-Y. Shum, "Flash cut: Foreground extraction with flash and no-flash image pairs," in *Computer Vision and Pattern Recognition, 2007 CVPR '07. IEEE Conference on.* IEEE, 2007, pp. 1-8.
[11] V. Prinet, D. Lischinski, and M. Werman, "Illuminant chromaticity from image sequences," in *Computer Vision (ICCV), 2013 IEEE International Conference on.* IEEE, 2013, pp. 3320-3327.
[12] A. Chakrabarti, K. Hirakawa, and T. Zickler, "Color constancy with spatio-spectral statistics," *Pattern Analysis and Machine Intelligence, IEEE Transactions on,* vol. 34, no. 8, pp. 1509-1519, 2012.
[13] S. H. Khan, M. Bennamoun, F. Sohel, and R. Togneri, "*Automatic* feature learning for robust shadow detection," in *Computer Vision and Pattern Recognition (CVPR), 2014 IEEE Conference on.* IEEE, 2014, pp. 1939-1946.
[14] A. Prati, I. Mikic, M. M. Trivedi, and R. Cucchiara, "Detecting moving *shadows:* algorithms and evaluation," *Pattern Analysis and Machine Intelligence, IEEE Transactions on,* vol. 25, no. 7, pp. 918-923, 2003.
[15] S. Hauberg, A. Feragen, and M. J. Black, "Grassmann averages for scalable robust pca," in *Computer Vision and Pattern Recognition (CVPR), 2014 IEEE Conference on.* IEEE, 2014, pp. 3810-3817.
[16] Communication systems/amplitude modulation. [Online]. Available: http://en.wikibooks.org/wiki/Communication_Systems/Amplitude_Modulation
[17] A. Kolaman and O. Yadid-Pecht, "Quaternion structural similarity: a new quality index for color images," *Image Processing, IEEE Transactions on,* vol. 21, no. 4, pp. 1526-1536, 2012.
[18] S. W. Hasinoff, E Durand, and W. T. Freeman, "Noise-optimal capture for high dynamic range photography," in *Computer Vision and Pattern Recognition (CVPR), 2010 IEEE Conference on.* IEEE, 2010, pp. 553-560.
[19] M. O'Toole, S. Achar, S. G. Narasimhan, and K. N. Kutulakos, "Homogeneous codes for energy-efficient illumination and imaging," *ACM Transactions on Graphics (TOG),* vol. 34, no. 4, p. 35, 2015.
[20] J. Gu, T. Kobayashi, M. Gupta, and S. K. Nayar, "Multiplexed illumination for scene recovery in the presence of global illumination," in *Computer Vision (ICCV), 2011 IEEE International Conference on.* IEEE, 2011, pp. 691-698.
[21] A. Kolaman, R. Hagege, and H. Guterman, "Light source separation from image sequences of oscillating lights," in *Electrical & Electronics Engineers in Israel (IEEEI), 2014 IEEE 28th Convention of* .IEEE, 2014, pp. 1-5.
[22] D. Poplin, "An automatic flicker detection method for embedded camera systems," Consumer Electronics, IEEE Transactions on, vol. 52, pp. 308-311, 2006.
[23] Sun, Jian, et al. "Strategies for extracting foreground information using flash and no-flash image pairs." U.S. Pat. No. 7,808,532. 5 Oct. 2010.

[24] Zoran ZIVKOVIC, et al. "Method and system for reliable reflective object detection using display light scene illumination." WIPO Patent No. WO 2012/175703 A1, 22 Jun. 2012.

[25] Friedhoff, Richard Mark, Bruce Allen Maxwell, and Casey Arthur Smith. "Method and system for use of intrinsic images in an automotive driver-vehicle-assistance device." U.S. Patent Application US 2013-0342694 A1.

The invention claimed is:

1. A method of producing video images that are independent of the background lighting, the method comprising:
  a) illuminating a scene, wherein the illumination is comprised of unknown background illumination and non-synchronized modulated illumination, wherein the background illumination is produced by at least one light source having spatially and temporally varying intensity;
  b) capturing with a camera sensor a plurality of N consecutive frames in time containing images of the scene;
  c) executing an algorithm that combines the amplitudes of the radiance of corresponding pixels in the N consecutive frames from step 'b' to form a single processed pixel, wherein the value of the amplitude of radiance of the processed pixel is that of only the modulated light;
  d) repeating step 'c' for all pixels in the N consecutive frames; and
  e) assembling all of the processed pixels to form a processed image that is independent of the background illumination;
  wherein, the non-synchronized modulated illumination is a combination of at least two modulated illuminations having the same type of modulation with the same or different characteristics simultaneously projecting light on the scene and, when the at least two modulated illuminations have different characteristics, the algorithm creates several versions of each processed pixel, wherein each version of a processed pixel has a value of the amplitude of radiance that is the same as that of those of the modulated illuminations having common characteristics.

2. The method of claim 1, wherein the non-synchronized modulated illumination is at least one of:
  a) amplitude modulated illumination having a single or several known constant frequencies and radiance amplitude coefficient;
  b) frequency modulated illumination having a varying frequency and a constant radiance amplitude coefficient; and
  c) phase modulated illumination having a varying phase with a constant frequency.

3. The method of claim 1, wherein the non-synchronized modulated illumination source is any light source configured such that its intensity can be turned on/off and controlled to mid ranges.

4. The method of claim 3, wherein the non-synchronized modulated illumination source is at least one of a LED, a laser, a fluorescent light, a tungsten light, and a halogen light.

5. The method of claim 1, wherein the non-synchronized modulated illumination source is located on the camera.

6. The method of claim 1, wherein the non-synchronized modulated illumination source is located away from the camera.

7. The method of claim 1, wherein the camera sensor is one of: CMOS, CCD, light field, global shutter, rolling shutter, multispectral, hyperspectral, grey scale, and color.

8. The method of claim 1, wherein the non-synchronized modulated illumination has one or a combination of wavelengths from one or more of the UV, IR, NIR, visible, x-ray, multispectral or hyperspectral bands.

9. The method of claim 1, wherein the camera type is one of: a web camera, an industrial camera, a security camera, a smart phone camera, an IP camera, a stereo camera, a structured light camera, an array of cameras, a light field camera, and a light field sensor.

10. The method of claim 1, wherein the frequency of non-synchronized modulated illumination and the camera frame rate are independent of each other.

11. A method of producing video images that are independent of the background lighting, when background lighting between frames is constant using a non-synchronized flash no flash technique, the method comprising:
  a) capturing a plurality of frames containing images of the scene using the flash no flash technique with a video camera;
  b) executing an algorithm that
    i) determines the values $Fnf_k = Lmax_k - Lmin_k$, where $Lmax_k$ and $Lmin_k$ are the local intensity maxima/minima over time respectively for corresponding pixels in N successive video frames and index $1 < k < M$ spans over the number of local maxima/minima in the N video frames; and
    ii) uses the equation $$\overline{AsyncFnf} = \frac{1}{M} \sum_{1}^{M-1} Fnf_k f$$

to generate a single processed pixel having the smoothed value of intensity $\overline{AsyncFnf}$;
  c) repeating step 'b' for all pixels in the N successive frames; and
  d) assembling all of the processed pixels to form a single processed image in which the flickering caused by inconsistent changes of the background lighting has been smoothed over.

* * * * *